United States Patent [19]

Kimoto et al.

[11] 4,376,140
[45] Mar. 8, 1983

[54] METHOD FOR PRODUCING A FLUORINATED COPOLYMER MEMBRANE

[75] Inventors: Kyoji Kimoto, Yokohama; Mikio Ebisawa, Hiratsuka, both of Japan

[73] Assignee: Asahi Kasei Kogyo Kabushiki Kaisha, Osaka, Japan

[21] Appl. No.: 184,270

[22] Filed: Sep. 5, 1980

[30] Foreign Application Priority Data

Sep. 6, 1979 [JP] Japan ............................ 54/113524

[51] Int. Cl.³ ............................................. B32B 27/06
[52] U.S. Cl. ................................. 427/244; 210/500.2
[58] Field of Search ............................ 521/27, 28, 38; 526/243; 427/245, 246, 244; 204/296; 156/306; 428/290, 74, 422, 442, 120, 520

[56] References Cited

U.S. PATENT DOCUMENTS

| 3,770,567 | 11/1973 | Grot | 521/27 |
| 3,849,243 | 11/1974 | Grot | 526/243 X |
| 4,151,053 | 4/1979 | Seko | 204/98 |

FOREIGN PATENT DOCUMENTS

| 48-61582 | 8/1973 | Japan | 521/27 |
| 52-24176 | 2/1977 | Japan | 521/27 |
| 52-24177 | 2/1977 | Japan | 521/27 |
| 52-134888 | 11/1977 | Japan | 521/27 |
| 53-104583 | 9/1978 | Japan | 521/27 |
| 53-116287 | 10/1978 | Japan | 521/27 |
| 54-6887 | 1/1979 | Japan | 521/27 |
| 54-4289 | 12/1979 | Japan | 521/27 |
| 1523047 | 8/1978 | United Kingdom | 521/27 |

Primary Examiner—Frank A. Spear, Jr.
Attorney, Agent, or Firm—Birch, Stewart, Kolasch and Birch

[57] ABSTRACT

A method for producing a fluorinated copolymer membrane comprising a first layer made from a fluorinated copolymer having pendant sulfonylchloride groups and a second layer made from a fluorinated copolymer having sulfonylfluoride groups. The membrane is treated with a reducing agent to introduce carboxylic acid groups onto the surface of said first layer. The membrane may be used as a cation exchange membrane. If necessary, a supporting material may be embedded in the second layer.

5 Claims, No Drawings

METHOD FOR PRODUCING A FLUORINATED COPOLYMER MEMBRANE

BACKGROUND OF THE INVENTION

This invention relates to fluorinated copolymer membranes useful as a precursor membrane for making a fluorinated cation exchange membrane for use in electrolysis of an aqueous solution of a halogenated alkali metal. More particularly, this invention relates to fluorinated copolymer membranes and the production of the same, the membrane being comprised of a first layer containing pendant sulfonylchloride groups and a second layer containing sulfonylfluoride groups.

In the industry of producing caustic soda and chlorine by electrolyzing salt, the ion-exchange membrane process has attracted special interest recently because this process is more advantageous than the conventional mercury and diaphragm processes in view of its effectiveness for preventing pollution and saving energy. The quality of the product of this ion-exchange membrane process is as satisfactory as that of the mercury process. Many fluorinated cation exchange membranes, therefore, have been proposed for this purpose, including those containing substituents such as sulfonic acid groups, carboxylic acid groups, sulfonamide groups and the like.

Among these membranes, those such as disclosed in Japanese Published unexamined patent application Ser. Nos. 24176/1977, 24177/1977, 104583/1978, 116287/1978 and 6887/1979 are preferable in view of their performance and chemical and physical resistance. They are the membranes in which carboxylic acid groups have been introduced by chemical treatment to the one surface of a fluorinated cation exchange membrane containing sulfonic acid groups.

Considering, as a whole, such features of the resulting membranes as performance, ease in controlling density gradient of a carboxylic acid group, simplicity of reaction steps, reagent cost, ease in suppressing side-reactions, possibility of changing pendant groups to perfluoro-groups, physical damage which might be introduced during chemical treatment, etc., it is noted that the most preferred one is that disclosed in Japanese Published unexamined patent application Nos. 24176/1977 and 24177/1977 (which have been combined and correspond to U.S. Pat. No. 4,151,053), in which carboxylic acid groups: $-OCF_2CO_2M$ (wherein M is H, a metal or ammonium group) have been incorporated in one surface layer of the resulting fluorinated cation exchange membrane containing sulfonic acid groups: $-OCF_2CH_2SO_3M$ (wherein M is the same as in the above).

Those fluorinated cation exchange membranes mentioned above have been produced by treating with a reducing agent fluorinated copolymer membranes having pendant groups including the group: $-OCF_2CF_2SO_2X$ [wherein X is halogen, OH, allyl, alkyl or OZ (Z being a metal, ammonium, allyl or alkyl)] or the group: $-OCF_2CF_2SO_2)_2O$, or preferably the group containing X being Cl or F, most preferably, the group of where X is Cl.

In order to form carboxylic acid groups on one surface of the membrane, the membrane has to be fixed with a frame and then only the one surface is assumed to contact with a reducing agent. In practicing this process on an industrial scale, it is necessary to mass-produce these membranes by manual work and this makes this process less economical.

SUMMARY OF THE INVENTION

The inventors of this invention intensively studied these problems concerning the membrane-manufacturing steps and completed this invention on the basis of the finding that, since there is a difference in reactivity to a reducing agent between sulfonylchloride and sulfonylfluoride groups of a fluorinated copolymer, it is possible to carry out the reaction only on the one surface to introduce carboxylic acid groups thereto even if the whole membrane is dipped into a solution of a reducing agent.

According to this invention, fluorinated copolymer membranes and methods of producing the same are provided. The membrane comprises (1) a first layer containing pendant sulfonylchloride groups, said layer being parallel to the surface of said membrane and (2) a second layer containing pendant sulfonylfluoride groups, said second layer being parallel to the surface of said membrane.

The thickness of the first layer comprised of the fluorinated copolymer containing sulfonylchloride groups is, in general, 1/100–5/10, preferably 3/100–2/10 of the total thickness of the membrane.

The second layer comprised of the fluorinated copolymer containing sulfonylfluoride groups may consist of a single layer in which the sulfonylfluoride groups are dispersed uniformly in the thickness direction. Alternatively, it may consist of two laminated laminae, each having a different density of sulfonylfluoride groups. In the latter case, the laminae which does not face the first layer has a higher density of sulfonylfluoride groups and the thickness thereof is preferably ½–49/50 of the total thickness of the membrane. It preferably contains a supporting material therein.

In a preferred embodiment of the fluorinated copolymer membranes of this invention, the second layer contains a supporting material so as to strengthen the membrane. The supporting material may be any one which is inert to alkalis and halogens. Preferably the reinforcing material is a woven textile of fluorocarbon resin, particularly woven textile of polytetrafluoroethylene or tetrafluoroethylene/hexafluoropropylene copolymer.

The total thickness of the fluorinated copolymer membrane of this invention is usually 1000–10 microns, preferably 500–25 microns, more preferably 250–100 microns.

A method of producing the fluorinated copolymer membranes of this invention comprises preparing a starting fluorinated copolymer membrane, such as disclosed in Japanese Published unexamined patent application No. 61582/1973 (which corresponds to U.S. Pat. No. 3,770,567), which comprises a first layer parallel to the surface of said membrane, said first layer being made from a fluorinated copolymer containing pendant sulfonic acid groups or salts thereof and a second layer parallel to the surface of said membrane, said second layer being made from a fluorinated copolymer containing pendant sulfonylfluoride groups, and contacting said membrane with a mixture of phosphorous pentachloride or phosphorous trichloride and chlorine, if necessary in the presence of a solvent, to convert the sulfonic acid groups or salts thereof to sulfonylchloride groups.

The fluorinated copolymer membrane containing sulfonic acid groups or salts thereof in the first layer and sulfonylfluoride groups in the second layer may be produced, as disclosed in said Japanese Published unexamined patent application, by copolymerizing a fluorinated olefin, preferably tetrafluoroethylene, with a fluorinated vinylether compound containing sulfonylfluoride groups, preferably

and hydrolyzing, after film making, only one surface of the resulting membrane with an alkali. Thereafter, for improvement of mechanical strength of the membrane, it is preferable to apply the aforementioned supporting material to the surface opposite to the hydrolyzed surface of the membrane. The membrane is heated to an elevated temperature and simultaneously drawn against the supporting material by means of a vacuum so as to embed it in the second layer containing sulfonylfluoride groups.

In addition, another fluorinated copolymer film containing a larger amount of

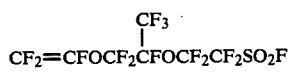

than the second layer may be laminated to the membrane surface of said second layer containing sulfonylfluoride groups prior to or simultaneously with embedding of said supporting material. In this case, the supporting material is embedded in the layer containing a larger amount of the sulfonyl-fluoride groups.

The copolymerization ratio of a fluorinated olefin to a fluorinated vinylether compound containing sulfonylfluoride groups may be described in terms of number of the grams of dry resin per equivalent weight of sulfonic acid groups (hereinafter referred to as "Equivalent Weight") for the hydrolyzed fluorinated carbon exchange membrane containing sulfonic acid groups. The ratio depends on the molecular weight of said fluorinated vinylether compound and is usually 500-2000. When said compound containing sulfonylfluoride groups is used, the ratio is generally adjusted to 900-1800, preferably to 1100-1600. If the additional film is laminated, the equivalent weight of the copolymer membrane only one surface of which has been hydrolyzed is adjusted, in general, to 1300-1800, preferably to 1320-1600 and that of the additional copolymer film to be laminated is adjusted, in general, to 900-1200, preferably to 1050-1150.

According to this invention, in order to convert the sulfonic acid groups or salts thereof to the sulfonylchloride groups, the aforementioned copolymer may be reacted with phosphorous pentachloride vapor or a solution of phosphorous pentachloride in phosphorous oxychloride or a halogenated organic compound and the like, in general, under such conditions and procedures as disclosed in Japanese Published unexamined patent application Ser. Nos. 134888/1977 and 4289/1979. However, for improvement of reaction rate and for prevention of side-reactions, the reaction temperature is preferably 80°-140° C. and the sulfonic acid groups may be in the form of an acid and/or its ammonium salt.

These sulfonic acid groups may easily be changed to either form by the hydrolysis of only one of the surfaces with a suitable alkali or by treatment with an acid or salt exchange, which is applied after the hydrolysis.

In the aforementioned method, instead of phosphorous pentachloride, a mixture of phosphorous trichloride and chlorine may be used.

The fluorinated copolymer membrane of this invention can be transformed into a cation exchange membrane of fluorinated copolymer substrate containing sulphonic acid groups having carboxylic acid groups formed by a chemical treatment on one of the surfaces thereof. The fluorinated copolymer membrane is dipped in a reducing agent dissolved in water, an organic solvent or a mixture thereof, such as disclosed in Japanese Published unexamined patent application Ser. Nos. 24176/1977 and 24177/1977 (see U.S. Pat. No. 4,151,053). Due to the difference in reaction rate of sulfonylchloride groups and sulfonylfluoride groups with respect to the reducing agent, the sulfonylchloride groups react substantially alone with said reducing agent. This reaction takes place forward stepwise from the surface of the membrane to the interior thereof. Thus, the sulfonylchloride groups are converted into carboxylic acid groups through sulfinic acid groups. Then, the remaining sulfinic acid groups may be changed to carboxylic acid groups by heating or may be changed to sulfonic acid groups by oxidation. Alternatively, the remaining sulfinic acid group may be treated with chlorine to change them to sulfonylchloride groups and then the sulfonylchloride groups are hydrolyzed with an alkali to sulfonic acid groups.

Any of the reducing agents, reaction conditions and reaction procedures disclosed in Japanese Published unexamined patent application Ser. Nos. 24176/1977 and 24177/1977 (see U.S. Pat. No. 4,151,053) may be optionally employed. However, because of a great difference in reactivity to a sulfonylchloride group and a sulfonylfluoride group and of ease in handling, the reducing agent is preferably a reducing inorganic acid or salt thereof, such as hydroiodic acid, hydrobromic acid, hypophosphorous acid, hydrogen sulfide, arsenious acid, phosphorous acid, sulfurous acid, nitrous acid, formic acid, oxalic acid, etc. Especially, a reducing inorganic acid is preferable. The reaction temperature is preferably 20°-100° C.

The density gradient of carboxylic acid groups formed in one layer of the membrane may be controlled by adjusting reaction factors, such as temperature, time and solvent composition so as to control the reaction rate and diffusion rate of reactant reagent into the membrane.

A preferred method of controlling the density of carboxylic acid groups is to carry out the treatment with said reducing agent in the presence of at least one organic compound selected from the group containing 1 to 2 carbon atoms consisting of alcohols, carboxylic acids, nitriles and ethers. This treatment may be carried out using an aqueous solution of the reducing agent in which said organic compound has been dissolved. The organic compound is preferably a carboxylic acid. The amount of an organic compound to be added is more than 100 ppm and may optionally be determined considering the membrane, reducing agent, and organic compound used.

As already mentioned, if the fluorinated copolymer membrane of this invention is employed, only one surface thereof may successfully be converted into the carboxylic acid form merely by dipping the whole membrane into the solution of a reducing agent. Thus, according to this invention, the manufacturing procedure can be simplified markedly in comparison with the conventional method in which the membrane of the sulfonylchloride form is fixed with a frame and only one surface thereof is modified.

In addition, according to this invention it is possible to use such a conventional membrane as disclosed in Japanese Published unexamined patent application No. 61582/1973 (see U.S. Pat. No. 3,770,567), which is the membrane of the sulfonylfluoride form having been hydrolyzed on only one surface thereof. It is necessary to provide such a hydrolyzed surface so as to embed a supporting material therein. This invention, therefore, is applicable to the conventional membrane manufacturing process. This is markedly advantageous.

Alternatively, a starting membrane, after embedding a supporting material, can be hydrolyzed and then the membrane can be changed to the sulfonic acid form. One surface only of the membrane is then converted into the sulfonylchloride form by utilizing phosphorous pentachloride or a mixture of phosphorous trichloride and chlorine, to prepare a membrane having a performance like the fluorinated copolymer membrane of this invention, taking advantage of the difference in reactivity with respect to sulfonylchloride groups and sulfonic acid groups.

However, the reaction to convert sulfonic acid groups to sulfonylchloride groups with phosphorous pentachloride and the like takes place at a temperature higher than 80° C. Thus, it is rather difficult to carry out such a high temperature reaction on only one surface on an economical scale. In addition, it is very troublesome to control the thickness and density gradient of the resulting carboxylic acid groups, because a sulfonic acid group is, unlike a sulfonylfluoride group, remarkably hydrophilic, and the conversion into carboxylic acid groups often proceeds from both surfaces of the layer containing sulfonylchloride groups.

The thickness of the layer containing carboxylic acid groups and the density gradient of carboxylic acid groups have an important influence on the performance and life of the resulting membrane. Therefore, it is a fatal defect that these factors cannot be controlled in this process in comparison with that of utilizing the present fluorinated copolymer membrane. Furthermore, since the membrane is in the sulfonic acid form, the membrane, after hydrolysis, has to be changed again to the sulfonylchloride group. Therefore, this prior art process is rather complicated in comparison with the present invention method.

This invention will be described in detail hereinafter in conjunction with examples, which are presented merely for illustration of this invention.

EXAMPLE 1

Into a stainless steel autoclave of 500 cc were charged 16 g of

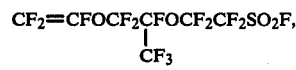

0.16 g of ammonium persulfate and deoxidized water. Ammonium perfluorooctanoate, an emulsifying agent, was added to the resulting mixture to emulsify it. Polymerization was carried out at a temperature of 50° C. and at a tetrafluoroethylene pressure of 5.5 kg/cm² with continuous addition of sodium hydrogen sulfite, an accelerator. A portion of the resulting polymer was subjected to hydrolysis with an alkali and then the equivalent weight (EW, hereinafter) was determined to be 1200.

After water washing, the polymer was shaped by presssing or extrusion into a film of 250 microns in thickness. Dimethyl sulfoxide in an aqueous caustic soda was applied to only one surface thereof to a depth of 19 microns so as to carry out hydrolysis. The resulting film was spread out with the nonhydrolyzed surface held downwardly on a plain-weave fabric of polytetrafluoroethylene 0.15 mm thick with warp and filling yarns, both of 400-denier multifilaments, repeating each at a rate of 40 yarns per inch. Vacuum suction was applied to this composite membrane from the fabric side and the fabric was embedded in the membrane to reinforce it while heating at a temperature of 270° C.

The sulfonic acid groups of this membrane were changed to the H-form with hydrochloric acid and then the membrane was thoroughly dried and dripped into a solution of phosphorous pentachloride and phosphorous oxychloride (1:3) at 110° C. for 20 hours to continue the reaction.

At the end of the reaction, the resulting membrane was subjected to measurement of attenuated total reflection spectrum (hereinafter referred to as "A.T.R."), which showed a strong absorption band at 1420 cm$^{-1}$ characteristic of sulfonyl chloride while an absorption band characteristic of sulfonic acid vanished for the hydrolyzed surface. On the other hand, only an absorption band at 1460 cm$^{-1}$ characteristic of a sulfonylfluoride group appeared on the supporting material embedded surface. This means that there was no change on this surface.

APPLICATION EXAMPLE 1

The membrane obtained in Example 1 was dipped into a 57% aqueous solution of hydroiodic acid at 80° C. for 24 hours to carry out the reaction. After the reaction was completed, the resulting membrane was subjected to measurement of A.T.R., which showed that the absorption band characteristic of sulfonyl chloride vanished and an absorption band at 1780 cm$^{-1}$ characteristic of a carboxylic acid group appeared.

However, it was noted that the sulfonylfluoride groups did not change at all. In a Crystal Violet solution, the surface opposite to the reinforced surface of the membrane was stained to a depth of about 15 microns.

The membrane was brought into contact with chlorine gas at room temperature for 5 hours and then was hydrolyzed with an aqueous 3 N caustic soda/50% methanol solution. A fluorinated cation exchange membrane containing carboxylic acid groups on one surface layer and sulfonic acid groups on the other surface layer was obtained.

COMPARISON EXAMPLE 1

In this example, Example 1 was repeated except that after reinforcement with a supporting material hydrolysis with an alkali was applied to provide a membrane which was in the sulfonic acid form, and the sulfonic acid groups were changed to sulfonylchloride groups in the same manner as in Example 1. The resulting membrane was dipped into a 57% aqueous hydroiodic acid solution at 80° C. for 24 hours to carry out the reaction. After the reaction was completed, the same post-treatment as in Application Example 1 above was applied to the membrane.

The resulting fluorinated cation exchange membrane contains carboxylic acid groups on both surfaces and had a higher electrical resistance and poor electrolytic properties in comparison with the membrane obtained in the Application Example 1.

EXAMPLE 2

In this example, Example 1 was repeated except that the polymerization was carried out at a tetrafluoroethylene pressure of 5 kg/cm$^2$ or 7 kg/cm$^2$. A portion each of the resulting polymers was weighed in the same manner as in Example 1 to determine its EW. The resulting EWs were 1100 and 1350, respectively.

The resulting polymer was shaped by pressing or extrusion into a film 100 microns thick for the former and 50 microns for the latter, hereinafter called "Membrane A" and "Membrane B", respectively.

One surface of Membrane B was hydrolyzed to a depth of 19 microns with an aqueous solution of caustic soda containing dimethylsulfoxide.

The resulting membrane was placed on Membrane A with the non-hydrolyzed surface held downwardly on Membrane A. The membrane A was in turn placed on a leno-weave fabric of polytetrafluoroethylene about 0.15 mm thick with filling weft yarns of 400 denier multifilaments and warp yarns of 200 denier multifilaments (X2) each repeating at a rate of 25 yarns per inch, respectively. Vacuum suction was applied to the resulting composite membrane from the fabric side at an elevated temperature. Thus, the fabric was embedded into the Membrane A simultaneously with the formation of a laminate of Membrane B and Membrane A and the supporting material thereof.

After sulfonic acid groups in the resulting composite membrane were changed to the H-form with hydrochloric acid, the composite membrane was brought into contact with an aqueous ammonium chloride so that about 25% of the H-form groups was changed to the ammonium salt-form groups. After thoroughly drying, the composite membrane was treated with phosphorous pentachloride vapor at 120° C. for 10 hours and then at 130° C. for another 30 hours.

At the end of the reaction, the membrane surfaces were subjected to measurement of A.T.R., which showed an absorption band at 1420 cm$^{-1}$ characteristic of sulfonylchloride groups on the hydrolyzed surface. The characteristic absorption of sulfonic acid groups vanished. On the other hand, the A.T.R. measurement on the surface of Membrane A into which the supporting material had been embedded showed only an absorption band at 1460 cm$^{-1}$ characteristic of sulfonylfluoride groups. This means that there was no substantial change.

APPLICATION EXAMPLE 2

The membrane obtained in Example 2 was dipped into a solution of 57% hydroiodic acid and glacial acetic acid (11:1) at 72° C. for 17 hours, then hydrolyzed with an alkali and further treated with a 5% aqueous hypochlorite soda at 90° C. for 16 hours. The A.T.R. measurement showed an absorption band at 1690 cm$^{-1}$ characteristic of carboxylate groups for the hydrolyzed surface of Membrane B and an absorption band at 1060 cm$^{-1}$ characteristic of a sulfonate group for the opposite surface thereof. In a Malachite Green solution adjusted at pH 2, the membrane in section was stained blue to a depth from the treated surface of about 14 microns and the interior thereof was stained yellow.

The following disclosure, translated from the Japanese, is incorporated from Japanese Published unexamined patent application (Kokai) Nos. 134888/1977 and 4289/1979, cited hereinabove.

Japanese Kokai 134888/77, Page 6, line 19—page 9, line 8

After sincere investigations concerning a method for sulfonylchlorinating a fluorocarbon cation exchanger having sulfonic acid groups in a short time and uniformly, the inventors have achieved the present invention which relates to a method for producing an intermediate product for a fluorocarbon ion exchange membrane, characterized by contacting and reacting the fluorocarbon cation exchanger having sulfonic acid groups with a solution of phosphorus pentachloride in phosphorus oxytrichloride and/or a halocarbon or halogenated hydrocarbon solvent so as to sulfonylchlorinate said sulfonic acid groups.

In other words, the present invention relates to a method for producing an intermediate product for a fluorocarbon ion exchanger, characterized by contacting and reacting a fluorocarbon cation exchanger containing sulfonic acid groups (expressed by —SO$_3$M in which M is a hydrogen atom, an alkali metal, an alkaline earth metal or an ammonium ion, or an alkylamine group having 1-4 carbon atoms) with a solution which is prepared by mixing and dissolving phosphorus pentachloride in phosphorus oxytrichloride and/or a halogenated hydrocarbon solvent in order to effect the sulfonylchlorination of the sulfonic acid groups.

When the following solution is used as a sulfonylchlorination agent, said solution being obtained by mixing and dissolving phosphorus pentachloride in phosphorus oxytrichloride and/or a halocarbon solvent such as trichloroethylene, 1,1,2-trichloroethane, perchloroethylene, 1,1,2,2-tetrachloroethane, 1,2-difluoro-1,1,2,2-tetrachloroethane, or the like, the solution can show very excellent reactivity and a very high rate for the sulfonylchlorination reaction and permits uniform reaction, compared with the case where phosphorus pentachloride is dissolved in a solvent which is stable thereto, that is, an aromatic hydrocarbon such as, for example, benzene, naphthenic hydrocarbons such as, for example, cyclohexane, and paraffinic hydrocarbons such as, for example, n-hexane. And also, such a solution makes it possible to obtain a higher rate for the sulfonylchlorination reaction and a more uniform reaction, even when compared with the case where phosphorus pentachloride is dissolved in a solvent which has some ability for sulfonylchlorination such as thionylchloride and phosphorus trichloride.

Furthermore, when phosphorus pentachloride is mixed and dissolved in phosphorus oxytrichloride and/or the above-mentioned halocarbon solvent, the ratio of phosphorus pentachloride to phosphorus oxytrichloride and/or halogenated hydrocarbon solvent is very important from the points of view of reactivity and economics. It has become obvious that the sulfonylchlorination reaction proceeds in a quite short time and very uniformly when the above ratio is in the range between 1.6/1–1/100, preferably 1/1–1/20.

EXAMPLE 1

Tetrafluoroethylene and perfluoro[3,6-dioxa-4-methyl-7-octenesulfonylfluoride] were copolymerized in 1,1,2-trichloro-1,2,2-trifluoroethane, using perfluoropropionyl peroxide as a polymerization initiator, keeping the temperature at 45° C. and the pressure at 5 Kg/cm$^2$G. This polymer was molded under heating to produce a membrane having a thickness of 125μ. The membrane was hydrolyzed in a solution of 2.5 N KOH/50% CH$_3$OH at 90° C. for 16 hours. A part of the membrane was examined with respect to its exchange capacity by the usual "neutral salt decomposition method", with the result of 1.00 meq/g-dry resin.

The thus produced fluorocarbon cation exchange membrane, having a thickness of 125μ and exchange capacity of 1.00 meq/g-dry resin, was cut into a piece of the size 10 cm×15 cm and immersed 5 times for 2 hours each in a 2 N hydrochloric acid bath heated to the temperature of 60° C. so that all of the sulfonic acid groups were completely converted into the acid form. After the membrane was dried for 16 hours in a hot-air dryer at 60° C., it was placed in a separable flask (one liter capacity) equipped with a reflux condenser, holding it between spacers made of "Tefzel". Thereafter, 1 kg of phosphorus pentachloride and 1 kg of phosphorus oxytrichloride were added. This separable flask was immersed in a bath at 130° C. so as to conduct the reaction for 24 hours. The temperature within the separable flask rose to about 120° C., and the liquor therein was boiling.

After the reaction, the membrane was taken out and washed with carbon tetrachloride heated to 60° C. to remove phosphorus pentachloride and phosphorus oxytrichloride, and then dried under vacuum.

The analysis of the membrane by infrared spectrometry indicated that the membrane was almost completely sulfonylchlorinated, because absorption at 1010 cm$^{-1}$ due to the sulfonic acid group and absorptions at 1470 cm$^{-1}$ and 1460 cm$^{-1}$ due to the sulfonic acid anhydride group disappeared.

Japanese Kokai 4289/79, Page 6, lines 7–20

According to further investigations, the present inventors have unexpectedly found that cation exchange groups contained in the outer layer of a cation exchange membrane can effectively be converted to their corresponding acid chloride groups in a thin layer in a short time without any decomposition, by reacting in the vapor phase a cation exchange membrane in the acid form with phosphorus pentachloride. . . . In other words, the present invention is a method for converting a cation exchange group to its corresponding acid chloride group, characterized by contacting at least one surface of a fluorinated cation exchange membrane in the acid form, in which a fluorine atom is bonded to at least an α-position carbon atom to the cation exchange group, with vapors of phosphorus pentachloride under such conditions that the said cation exchange groups are not substantially removed.

Page 8, line 2 from the bottom—page 10, line 2

Generally speaking, the reaction may be conducted for a suitable period of time at a temperature, for example 80°–200° C., preferably 100°–170° C. in the case of sulfonic acid groups, and 80°–180° C., preferably 100°–160° C. in the case of carboxylic acid groups. The vapor of phosphorus pentachloride may be present either under ambient or superatmospheric pressure. Thus, the amount of the acid chloride group in the outer layer of the membrane and the thickness of the converted layer in said outer layer can be effectively controlled depending on conditions such as vapor pressure of phosphorus pentachloride, reaction temperature, and reaction time, without substantial decomposition of the cation exchange group. When the reaction temperature is below 80° C. in the case of using phosphorus pentachloride, a long time is necessary and the efficiency is not high, and, furthermore, from the viewpoints of the diffusion speed of phosphorus pentachloride into the membrane and the reaction rate thereof in the outer layer, the reaction proceeds slowly into the membrane with relative uniformity. Therefore, such a procedure is not desirable for the present purpose, i.e., the cation exchange groups in the outer layer of the membrane are converted into acid halide groups. On the other hand, the use of a temperature above 180° C. for carboxylic acid groups or above 200° C. for sulfonic acid groups is not desirable from the point of view of economy and stability because the resulting acid chloride group is thermally decomposed. Although the reaction time can be varied depending upon the reaction temperature and the vapor pressure of phosphorus pentachloride, it is, in general, within the range between 5 minutes and 24 hours.

Page 12, line 12–page 14, line 5

EXAMPLE 1

A highly polymeric membrane (0.15 mm thick) made from a copolymer of perfluoroalkyl vinyl ether sulfonylfluoride, predominantly perfluoro(3,6-dioxa-4-methyl-7-octene sulfonylfluoride), and tetrafluoroethylene was hydrolyzed in a bath composed of dimethylsulfoxide, water and caustic soda to produce a cation exchange membrane in the acid form. The exchange capacity thereof was 0.91 meq/g of dry membrane (H form). The membrane was immersed into an excess of 60% HNO$_3$ at 60° C. for 16 hours in order to convert it completely into the acid form, and thereafter it was washed with water, followed by drying under a reduced pressure.

Using a stainless steel autoclave having an inner diameter of 10 cm and a height of 10 cm, the cation exchange membrane was inserted into the autoclave along its inner surface, and 10 g of phosphorus pentachloride which was laid on a watch glass was placed in the center part of the autoclave. After the autoclave was sealed, it was immersed in an oil bath at 140° C., and, after standing for 2 hours, the content in the autoclave was taken out. After the membrane was fully washed with water, a portion of the membrane was cut off and subjected to analysis for infrared reflection spectrometry in order to examine the outer layer thereof. Then, a new strong absorption peak at 1420 cm$^{-1}$ was observed while the peak corresponding to the sulfonic acid group at 1060 cm$^{-1}$ disappeared. After this membrane was immersed in an acidic bath of Crystal Violet and allowed to stand for 16 hours, the observation of the cross-section of the thus-treated membrane showed that each side of the membrane was not dyed to the depth of 10μ but that the central part was distinctly dyed. By way of precaution, after this membrane was immersed in a 10% NaOH solution in methanol to hydrolyze the sulfonyl chloride groups into sulfonic acid groups, the dyeing tests were again carried out. The results showed that the membrane was distinctly dyed in its cross-section with disappearance of the absorption peak at 1420 cm$^{-1}$ and appearance of absorption at 1060 cm$^{-1}$.

What is claimed is:

1. A method of producing a fluorinated copolymer membrane comprising a first layer substantially parallel to the surface of said membrane and said first layer being made from a fluorinated copolymer containing pendant sulfonylchloride groups, and a second layer substantially parallel to the surface of said membrane and said second layer being made from a fluorinated copolymer containing pendant sulfonylfluoride groups, which comprises bringing a starting fluorinated copolymer membrane into contact with phosphorous pentachloride or a mixture of phosphorous trichloride and chlorine at a temperature of 80°–140° C., said starting membrane comprising (1) a first layer substantially parallel to the membrane, said first layer being made from a fluorinated copolymer containing pendant sulfonic acid groups or salts thereof, and (2) a second layer substantially parallel to the membrane, said second layer being made from a fluorinated polymer containing pendant sulfonylfluoride groups.

2. A method as defined in claim 1, in which a supporting material is incorporated substantially in said second layer.

3. A method as defined in claim 2 or 1, in which the thickness of said first layer is 1/100–5/10 of the total thickness of the membrane.

4. A method as defined in claim 2 or 1, in which said second layer comprises two laminae each having a different density of sulfonylfluoride groups.

5. A method as defined in claim 1, in which the first layer of said starting fluorinated copolymer membrane contains pendant sulfonic acid groups and/or ammonium salts thereof.

* * * * *